Nov. 19, 1946. C. A. MANN 2,411,282
FLUID OPERATED MOTOR
Filed Aug. 5, 1943 8 Sheets-Sheet 1

INVENTOR.
CECIL A. MANN
BY
ATTORNEY.

INVENTOR.
CECIL A. MANN
BY
ATTORNEY.

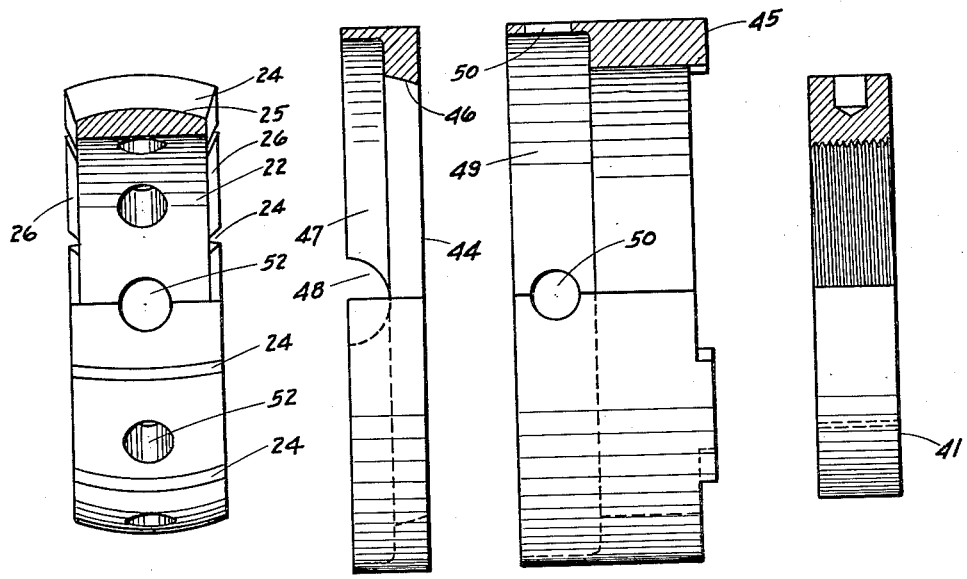
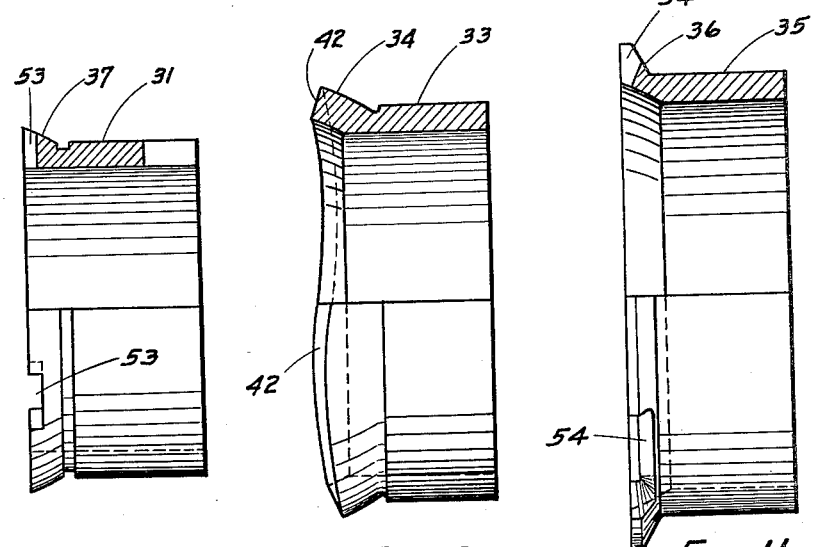
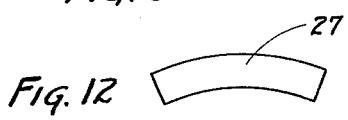
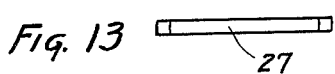

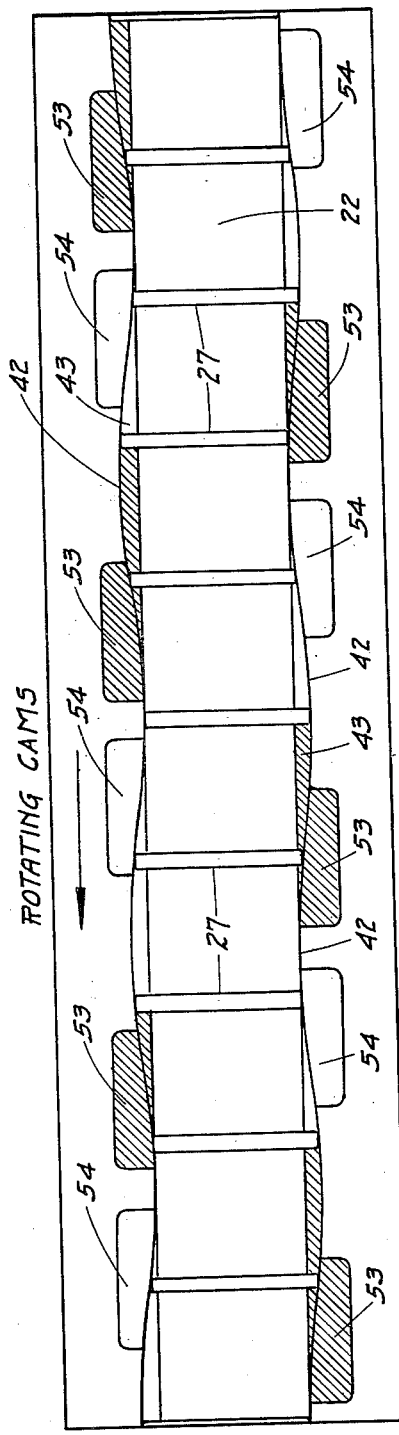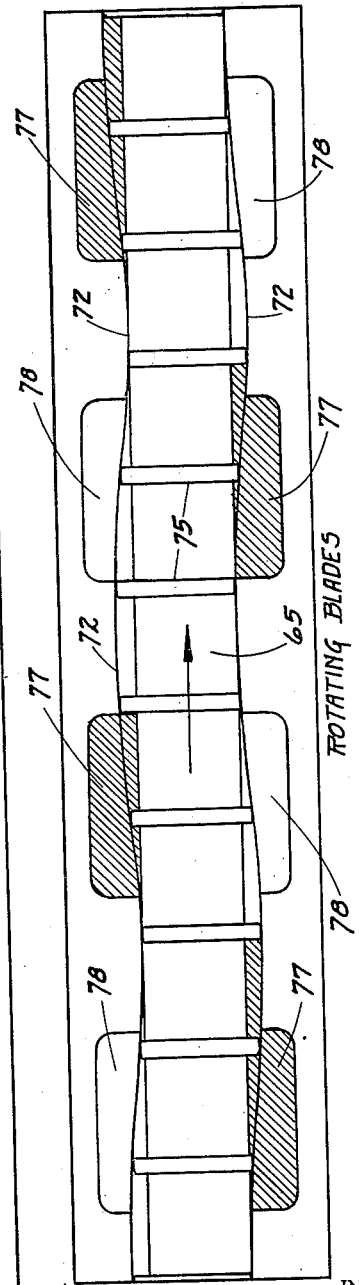

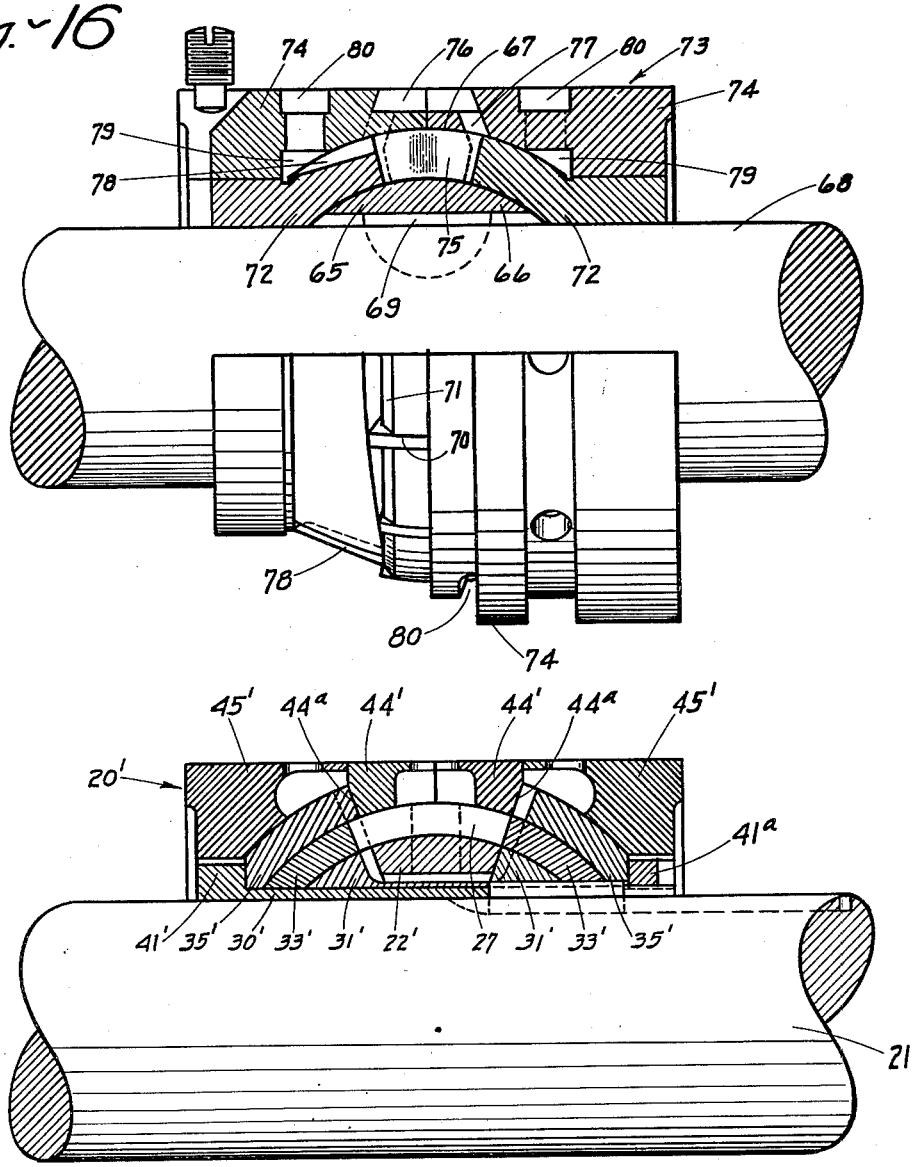

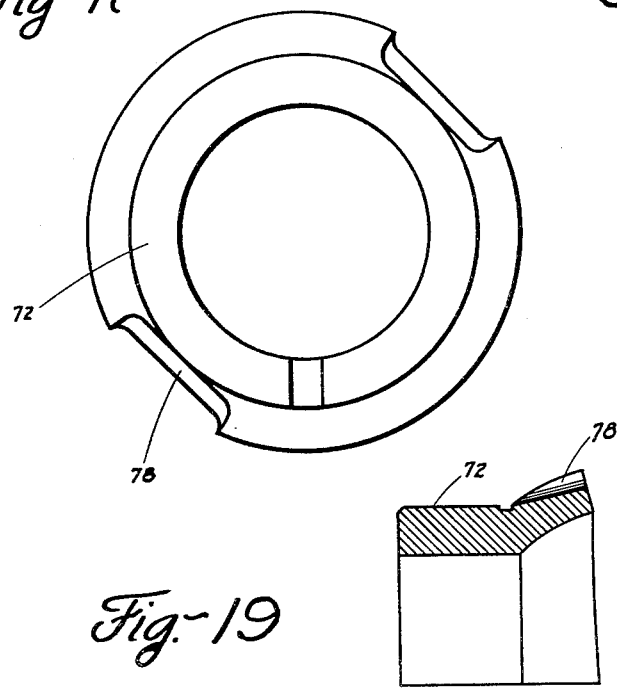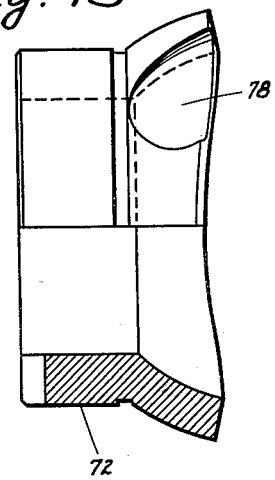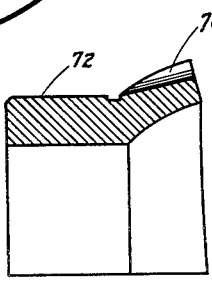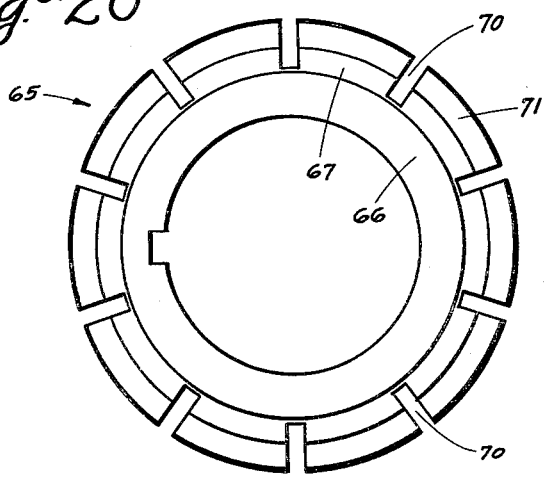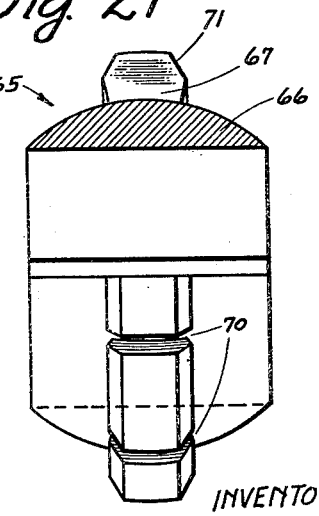

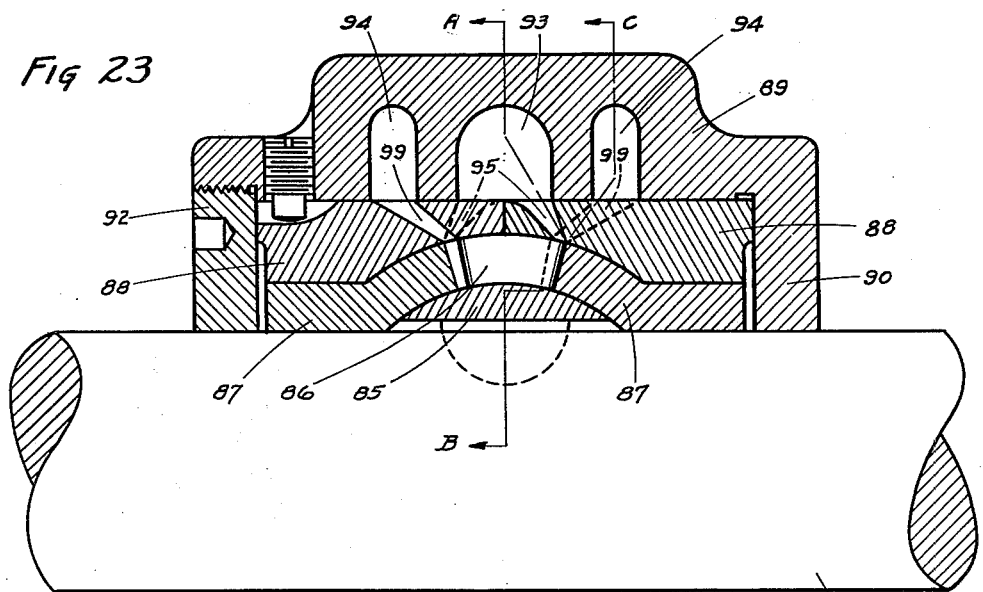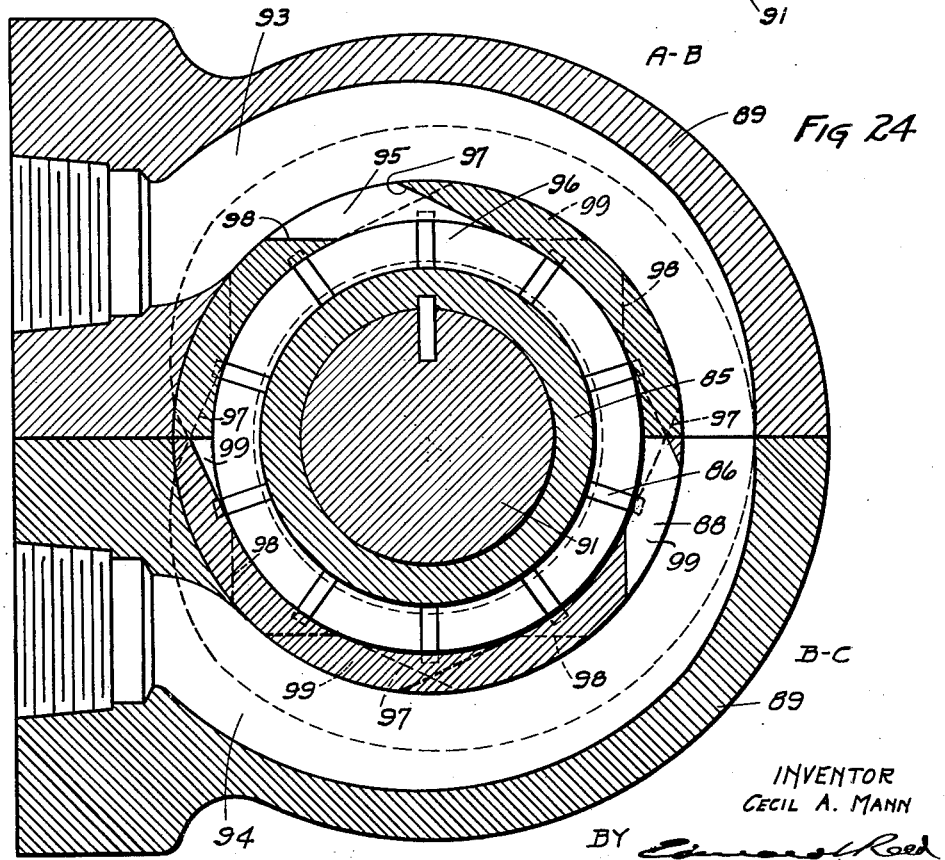

Patented Nov. 19, 1946

2,411,282

UNITED STATES PATENT OFFICE 2,411,282

FLUID OPERATED MOTOR

Cecil A. Mann, Dayton, Ohio

Application August 5, 1943, Serial No. 497,419

30 Claims. (Cl. 121—89)

This invention relates to a fluid operated motor, and it is an object of the invention to provide such a motor capable or operating at very high speeds without vibration and which will be of light weight with relation to the power developed.

A further object of the invention is to provide such a motor in which the arrangement and relative movements of the cooperating parts are such as to maintain proper hydraulic balance at all speeds.

A further object of the invention is to provide such a motor in which all mechanical rotation is about a single fixed point or axis.

A further object of the invention is to provide a fluid displacement device which will operate smoothly and quietly at all speeds and in which surfaces of the desired contour may be easily and accurately formed.

A further object of the invention is to provide such a motor in which the end thrust and radial thrust on the abutment forming blades will be reduced to a minimum.

A further object of the invention is to provide a motor of such a construction that various contacting parts thereof may be lapped to provide tightly sealed joints between the same.

Other objects of the invention may appear as the motor is described in detail.

Figure 1:
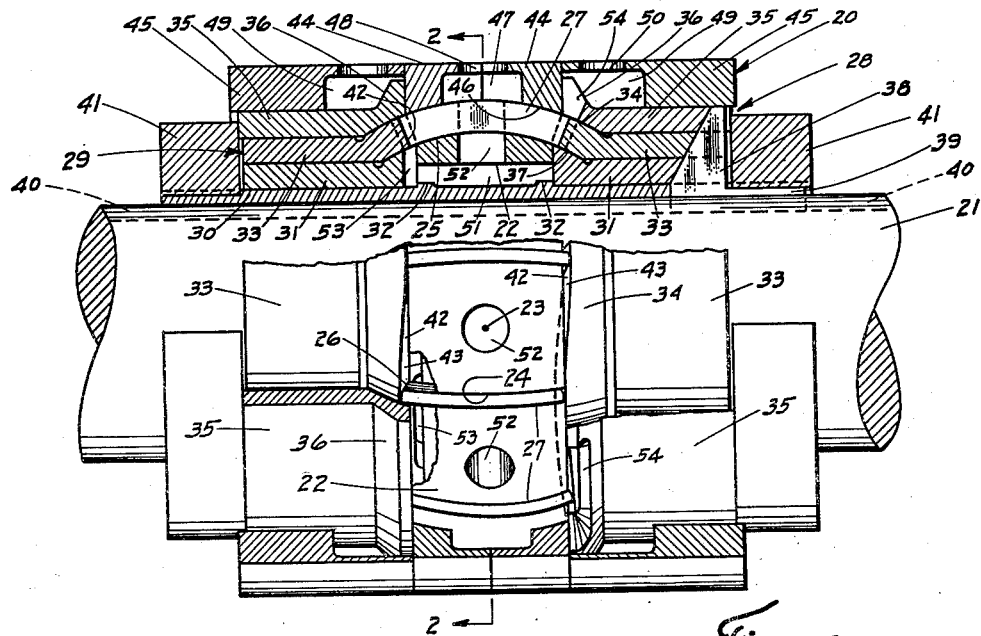
Figure 2:
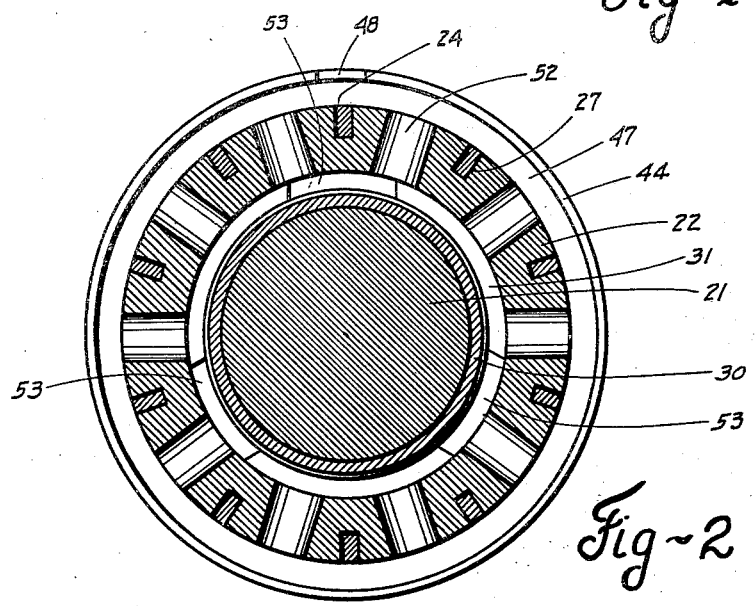
Figure 3:
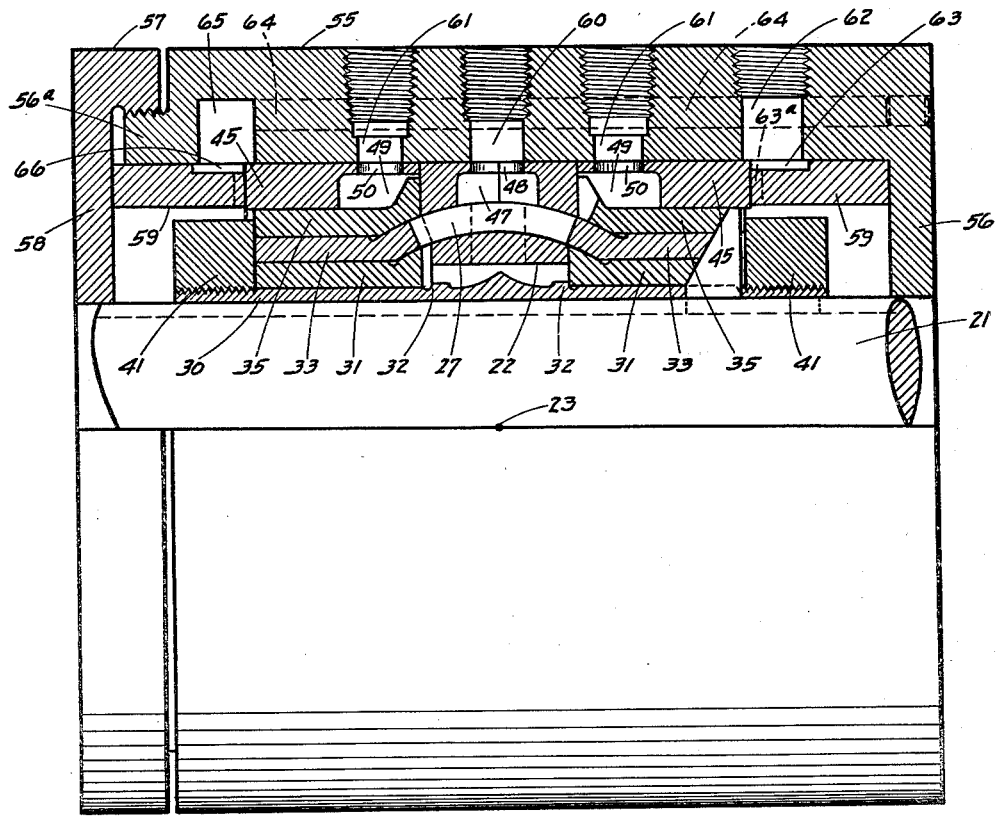
Figure 4:
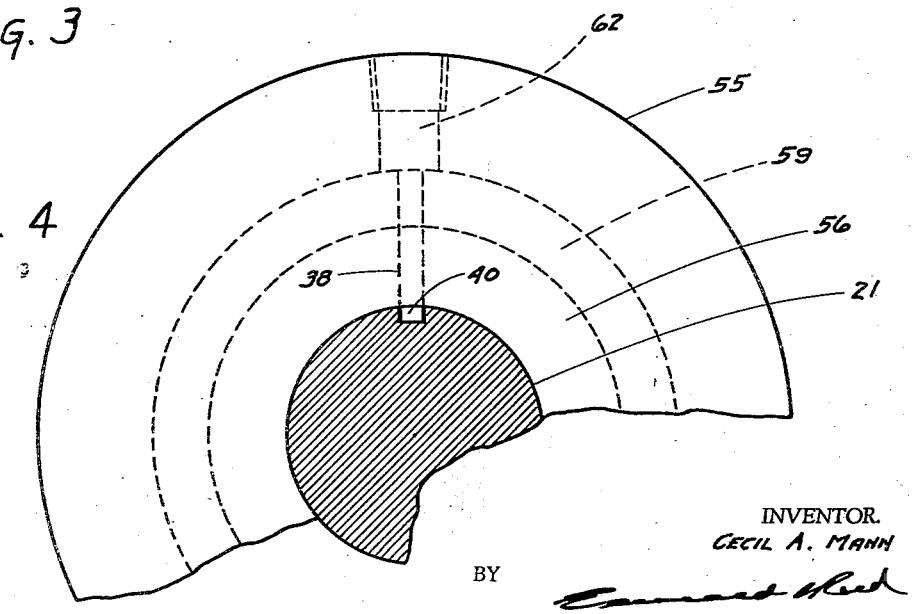
Figure 25:
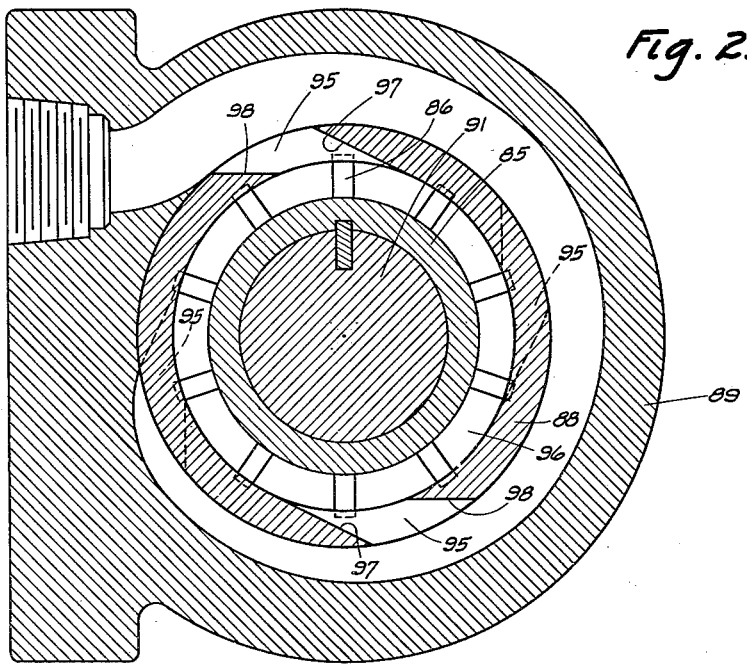
Figure 26:
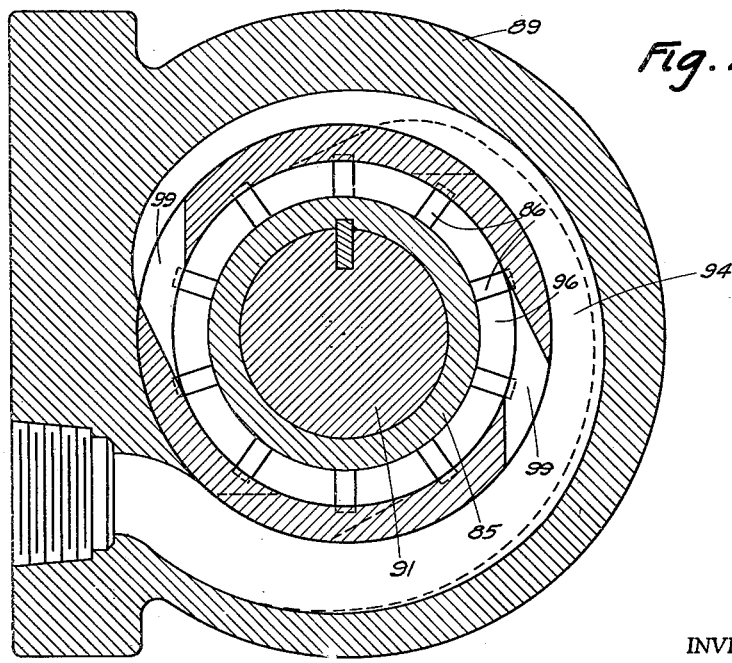

In the accompanying drawings Fig. 1 is a side view of a motor embodying the invention, partly in section and partly broken away; Fig. 2 is a transverse sectional view on the line 2—2 of Fig. 1; Fig. 3 is a side elevation, partly in section, of the motor and its supporting structure; Fig. 4 is an end view, partly broken away, of the structure shown in Fig. 3; Fig. 5 is a detail view, partly in section, of the blade carrier; Fig. 6 is a similar view of one of the intermediate frame members of the casing; Fig. 7 is a similar view of one of the end frame members of the casing; Fig. 8 is a similar view of a locking nut; Fig. 9 is a similar view of the inlet port member; Fig. 10 is a similar view of the cam member; Fig. 11 is a similar view of the outlet port member; Fig. 12 is a side elevation of one of the blades; Fig. 13 is an edge view of the blade looking toward the inner side thereof; Fig. 14 is a diagrammatic lay-out of the motor of Fig. 1; Fig. 15 is a sectional view showing a slight modification of the motor of Fig. 1; Fig. 16 is a side elevation, partly in section, of another embodiment of the invention; Fig. 17 is an axial view of one of the cams of the motor of Fig. 16; Fig. 18 is a front elevation, partly in section, of said cam; Fig. 19 is a sectional detail of said cam on a line extending through one of the ports; Fig. 20 is an axial elevation of the blade carrier; Fig. 21 is a front elevation, partly in section, of the blade carrier; Fig. 22 is a diagrammatic lay-out of the motor of Fig. 16; Fig. 23 is a radial section of a modification of the motor of Fig. 16; Fig. 24 is a sectional view of the motor of Fig. 23, the upper portion being taken on the line A—B of Fig. 23 and the lower portion being taken through the lower portion of the motor on a line corresponding to the line B—C; Fig. 25 is a complete transverse section taken on the line A—B of Fig. 23; and Fig. 26 is a complete transverse section taken through one of the outlet conduits substantially on the line C—B.

In these drawings I have illustrated certain embodiments of the invention, in each of which the invention is shown as embodied in a small size high speed hydraulic motor, the drawings being on an enlarged scale. It is to be understood, however, that the invention may be embodied in fluid displacement devices of various kinds and sizes and that the device, and the several parts thereof, may take various forms without departing from the spirit of the invention; and, further, that the device may be used either as a motor or as a pump and the term "motor" in the specification and claims is used as a word of description and not as a limitation.

In its broader aspects the motor herein illustrated comprises an outer casing adapted to be supported about a shaft, an annular blade carrier arranged within the casing, blades carried by the blade carrier and movable transversely thereto, cams arranged on the opposite sides of the blade carrier and having sliding contact with the blades and shaped to form between the same and the blade carrier work chambers into and out of which the end portions of the blades are moved by the action of the cams thereon, and means for supplying fluid to and exhausting the same from the work chambers. In the construction illustrated in Fig. 1 the blade carrier is shown as stationary and the cams as rotatable but this is not essential and the blade carrier may be rotatable and the cams stationary without departing from the essentials of the invention. Further, various features of the invention may be embodied in a motor having a work chamber, or work chambers, on one side only of the blade carrier.

One of the more important purposes of the invention is to provide a fluid displacement device in which the working surface of an element, such as the blade actuating element or cam of a de- vice of the expansible chamber type or a corresponding element of a device of a different type, may be easily and accurately generated and ground to the desired contour. In fluid displacement devices of the expansible chamber type as heretofore designed, for the most part at least, the generating and grinding of such surfaces has been difficult and subject to inaccuracies. In such prior devices the blades, which usually moved in lines parallel with the axis of rotation of the rotatable element, were actuated by a cam having a working surface of varying angles generated about the axis of a cylinder. After the working surface had been hardened it was necessary to grind the same to eliminate distortions resulting from the hardening process and to provide the surface with an exactly correct contour. Due to the positions of the various parts of the working surface with relation to the axis of the cam the accurate grinding thereof was a difficult and tedious operation, which could not be effected commercially or on a production basis. As a result such devices have had a very limited use and, so far as I am informed, have never been manufactured on a production basis. In accordance with this invention all movable parts of the device move about a single point or center and each and all parts of the working surface of such an element are in lines extending through said center, thus permitting the surface to be easily generated and to be accurately ground, as by a frusto-conical grinding member having its apex at said center. This arrangement is best effected by providing certain of the elements with surfaces conforming to sections of spheres having a common center, some of said spherical surfaces being in running contact one with the other and some being in fixed and tightly sealed contact one with the other.

In addition to providing a device which can be easily manufactured on a production basis, such an arrangement provides proper hydraulic balance and smooth quiet operation at all speeds, and in an expansible chamber device of the blade type, enables the blades to move lengthwise on an axis transverse to their length with less vibration than when they move in lines parallel with the axis of the device, and said arrangement also enables the centrifugal force to be utilized to advantage in devices of various designs.

In each of the constructions here illustrated the invention is embodied in a motor of the expansible chamber type in which certain of the elements are provided with surfaces conforming to sections of spheres having a common center. The work chamber is formed between a blade carrier and a blade actuating cam, all transverse portions of the opposed surfaces of which are in lines extending through the center of said spheres and the movable elements move about said center on axes extending through the same, the blades moving transversely about one axis and longitudinally about another axis. However, the invention is not limited to such a construction or to fluid displacement devices of the expansible chamber type but may be embodied to advantage in fluid displacement devices of other types.

As shown in Figs. 1 to 14, the motor comprises an outer casing 20 adapted to be supported in a fixed position about a shaft 21 in any suitable manner, as will be hereinafter described. Arranged within the casing and held against rotation with relation thereto is an annular blade carrier 22 (see Fig. 5) which conforms to a section of a sphere having its center at the axis of the shaft 21, the longitudinal position of the center being indicated at 23 in Fig. 1. This blade carrier is provided with a circumferential series of transverse slots 24, in the present instance ten, the bases or inner walls 25 of which are curved about the center of said sphere on an axis transverse to the axis of rotation of the motor. The lateral surfaces 26 of the slotted or outer portion of the blade carrier are in lines converging to the center of the sphere. Mounted in each slot is a blade 27 which is curved about the center of said sphere and which is of a length greater than the width of the slotted portion of the blade carrier. The ends of each blade are in lines converging to the center of the sphere and the corners thereof may be slightly rounded to prevent biting into the cam surfaces.

Mounted about the shaft and secured thereto for rotation therewith is a rotor which comprises two cam units 28 and 29 spaced axially one from the other and arranged on opposite sides of the blade carrier 22. The rotor may be mounted directly upon the shaft 21 but to enable the motor to be assembled and then mounted on or removed from the shaft as a unit I prefer to mount the rotor on an elongate bushing or sleeve 30 removably mounted on the shaft. Each cam unit includes an inlet or high pressure port member or ring 31 mounted on the sleeve 30 and abutting against a shoulder 32 thereon. Mounted on and fitting snugly about the port ring 31 is an annular cam member 33 having that portion thereof adjacent the blade carrier deflected outwardly, as shown at 34. Mounted on and fitting snugly about the cam member is an outlet or low pressure port member or ring 35, having an outwardly deflected portion 36 fitted about the part 34 of the cam member. The inlet port ring 31 has that portion thereof adjacent to the part 34 of the cam member enlarged or extended outwardly, as shown at 37, to engage the part 34 of the cam member. The contacting surfaces of the parts 37, 34 and 36, each conforms to a section of a sphere described about the center 23. The several members of each cam unit are rigidly connected one to the other for rotation in unison by keys, one of which is shown at 38, each key having a portion 39 constituting a spline and extending into a groove 40 in the shaft 21, thus serving to rigidly connect the cam units, the sleeve and the shaft. Nuts 41 screw threaded on the ends of the sleeve act on the respective cam units and more particularly on the outer port member 35 to hold the several parts against axial displacement, the pressure of the nut on the part 35 forcing the deflected portion thereof against the deflected portion of the cam member and this in turn forcing the deflected portion of the cam member against the enlarged part 37 of the inner port ring and forcing that port ring against the shoulder 32.

The deflected portion 34 of each cam member is provided on its edge with a cam surface 42 which is formed with a plurality of lobes arranged close to and preferably in sealed running contact with the adjacent lateral surfaces 26 of the blade carrier, the intermediate parts of the cam surface being spaced from the blade carrier to form work chambers, as shown at 43 in Fig. 1. This cam surface in the present instance has three lobes and comprises a true compound sine curve and the cam surface at all circumferential points is in a line which extends through the center of the sphere and is thus in true parallelism with the end of each blade at all points at which the blade may engage the same. Thus the working surface of the cam is a conical surface of varying angles having a common apex at the center of the spheres and can be easily and accurately ground by a frusto-conical grinder having its apex coincident with the apex of said cones. The cam surfaces 42 of the two cam members are spaced one from the other the same distance at all opposed circumferential points, that is, the points contacted by the ends of any one blade, which points may or may not be in a line at right angles to the plane of rotation, and the blades 27 are of a length equal to the distance between the cam surfaces, so that the rotation of the cams with relation to the blade carrier will cause the end portions of the blades to move successively into and out of the work chambers.

The casing 20 comprises intermediate annular frame members 44 and end frame members 45. The intermediate frame members 44 have their inner surfaces 46 conforming to sections of a sphere having its center at the axis of the shaft, as shown at 23, and therefore conform to the exterior surface of the blade carrier and constitute the outer walls of the blade slots 24. The adjacent inner portions of these frame members are recessed, as shown at 47, to form a circumferential inlet channel and the abutting outer edges thereof are provided with opposed recesses 48 which register one with the other to form an inlet to the channel 47. The end members 45 fit about the cylindrical portions of the outlet port members 35 with a running fit and are recessed at 49 to form annular outlet or exhaust channels, and the outer circumferential portion of each end member abuts against the corresponding intermediate frame member 44 and is provided with an opening 50 which constitutes an outlet for the exhaust channel 49.

The inner surface of the annular blade carrier is spaced from the sleeve 30 and this space, between the two inlet port members, constitutes a passage 51 which is connected with the inlet channel 47 by a series of radial openings 52 through the blade carrier. Each inlet port member is provided with a series of ports 53, in the present instance three, to connect the inlet passage 51 with the work chambers 43 formed by the spaces between the cam surfaces and the blade carrier. Fluid being delivered under pressure to the work chambers acts against the abutments formed by the end portions of the blades in the work chambers and against the inclined forward portions of the cam surfaces, and the cam unit is caused to rotate forwardly. The outlet port members 35 are each provided with a plurality of ports 54, in the present instance three, to connect the work chambers with the outlet channels 49. Due to the location of the inlet passage 51 at the inner sides of the work chambers and the outlet passages 49 at the outer sides thereof the fluid flows outwardly through the work chambers and the centrifugal force resulting from the high speed of rotation expedites this flow and increases the effective pressure of the fluid. The fluid is delivered to the inlet passage 51 through the circumferentially spaced openings 52 in the blade carrier and is therefore uniformly distributed and has little tendency to flow circumferentially in the inlet passage.

The motor casing 20 may be supported and the inlet and outlet channels connected respectively with a supply conduit and an exhaust conduit in any suitable manner. In the present instance the motor casing fits snugly within a tubular structure, or housing, 55 of a length greater than the overall length of the motor and having at one end a flange 56 which has running clearance with the shaft 21 and having at the other end a threaded boss 56a to receive a nut 57 provided with an inwardly extending flange 58 which also has running clearance with the shaft. Interposed between the flanges 56 and 58 and the respective end frames 45 of the motor casing are annular spacing members 59 which abut against the respective end members 45 so that upon the tightening down of the nut 57 the parts of the motor casing will be clamped firmly one against the other and the casing will be held against movement with relation to the tubular structure 55. This tubular supporting structure is provided with a passage 60 communicating with the inlet 48 leading to the inlet channel 47 and the outer portion of this passage is threaded to enable the same to be connected with a supply conduit for fluid under pressure. The tubular member is also provided with circumferential channels 61 leading to the exhaust channels 49, and with threaded passages to connect the channels with exhaust conduits. The tubular member is further provided with a passage 62 leading to a channel 63 formed in the spacing member 59 and adapted to receive any seepage which may take place in the motor casing and between the motor casing and the supporting structure. This passage 62 is connected by a longitudinal passage or bore 64 with a chamber 65 in the tubular structure which communicates with an annular channel 66 in the spacing member at that end of the tubular structure opposite the passage 62 so that seepage at this end may flow freely through the bore to the discharge or "drip" passage 62, the outer portion of which is threaded to receive a waste pipe. The spacing members 59 have serrated edges 63a to permit the passage of fluid. The several passages through the tubular structure 55 are here shown in a line extending lengthwise of the structure but they may be, and usually will be, located at different points about the circumference of the structure.

In the lay-out of Fig. 14 the blade carrier is indicated at 22, the blades at 27, the cam surfaces at 42, the work chambers at 43, the inlet ports at 53 and the outlet ports at 54, the inlet ports having been lined to distinguish the same from the unlined outlet ports. The cams move in the direction of the arrow and it will be noted that the inlet ports, which rotate with the cam members, are always in communication with the forward portion of the work chambers with which they are associated and that the outlet ports 43 are in communication with the rear ends of those work chambers, it being remembered that the inlet ports enter the work chambers from below and the outlet ports are arranged above the work chambers. As the forward end of an inlet port moves past one of the blades 27 the fluid under pressure will enter the space between that blade and the forward inclined surface of the cam, and the pressure of the fluid will impart forward movement to the cam. As the cam continues to move a second blade will enter the same work chamber before the succeeding outlet port has moved into line with the first blade, and the fluid will continue to enter the work chamber between the two blades as well as between the second blade and the forward surface of the cam. The fluid continues to act on both blades until the inlet port passes the second blade and at that time or shortly thereafter the forward edge of the outlet port will pass the first mentioned blade and permit the fluid between the two blades to escape through the outlet channel. This action takes place continuously at the six inlet ports and the six outlet ports so that extremely high speed and high power may be developed. Due to the construction and arrangement of the parts above described the motor will operate at extremely high speeds without vibration and will be maintained in proper hydraulic balance at all speeds. The lapped spherical surfaces provide tight joints between the contacting parts, whether fixed or relatively movable, and as a result the joints are substantially fluid tight and the operation is smooth and quiet.

In Fig. 15 I have shown a modified form of the invention in which the blade carrier 22' is similar to the blade carrier above described except that the lateral surfaces thereof are in straight lines converging to the center of the sphere throughout their area, while in the form above described the slotted portions only of the lateral surfaces of the blade carrier are in converging lines. The intermediate and end frame members of the casing are similar to those above described and the lateral surfaces of the inwardly extending portions of the intermediate frame members 44' converge toward the center of the sphere in line with the respective lateral surfaces of the blade carrier, as shown at 44a. The inner surfaces of the end frame members 45' conform to sections of spheres described about the center of the aforesaid sphere so as to have a running fit on the spherical surfaces of the outer port rings. In each cam unit the several members thereof, that is the inner port member 31', the cam member 33' and the outer port member 35' are provided with outer surfaces which conform to sections of spheres throughout their areas and the inner surfaces of the cam member and of the outer port member likewise conform to sections of spheres throughout their areas. The inner port member 31' has an axial bore to receive the sleeve 30' and the cam member and the outer port member have circular openings to fit about the sleeve. Those edges of the inner and outer port members which are adjacent the blade carrier are arranged in a line which extends through the center of the sphere and the high points of the cam lobes are also in a line which extends through the center of the sphere and is flush with the adjacent edges of the inner and outer port members. Thus each cam unit has its edge surface parallel with and in contact with the adjacent side of the blade carrier and the adjacent surface of the inner frame member. The sleeve 30' is provided at one end with an enlargement 41' against which the edge of the outer port ring 35' of the adjacent cam unit abuts and a nut 41a threaded onto the other end of the sleeve contacts the adjacent edge of the other cam unit so that all the members are firmly secured to the sleeve. This construction enables the cam units to be assembled prior to the assembly of the motor as a whole and the edges of the port rings finished simultaneously and with complete accuracy, and likewise the lateral surfaces of the blade carrier and of the inner frame member can be finished to exact alinement prior to assembly. Further, in this construction, centrifugal force opposes and largely prevents the leakage of fluid between the contacting surfaces of the outer port ring 35' and the end frame member 45', while permitting the lubrication of those surfaces. This modified form of the motor would be mounted in the same manner and would be operated in the same manner as the motor above described.

In Figs. 16-22 I have shown another embodiment of the invention in which the number of parts has been substantially reduced and the motor otherwise simplified. As there shown, the blade carrier 65 comprises an inner or base portion 66 and an outer portion 67. The outer surface of the base portion conforms throughout its area to a section of a sphere having its center at the axis of the shaft 68 about which the blade carrier is mounted and, in the present arrangement, the inner or base portion thereof is secured to the shaft, as by a key 69. The outer portion 67 of the blade carrier is of a width substantially less than the width of the base and also has its outer surface conforming to a section of a sphere described about the aforesaid center. This outer portion of the blade carrier is provided with a circumferential series of transverse slots 70, the inner walls of which are formed by the spherical surface of the base 66. There may be any suitable number of these slots, either odd or even, and in the construction here shown there are ten slots to receive a corresponding number of blades. Those parts of the lateral surfaces of the outer or slotted portion of the blade carrier, which are adjacent the base, converge toward the center of said sphere and the outer lateral parts or corners of the blade carrier are cut away or beveled as shown at 71 for a purpose which will hereinafter appear.

The cam units are supported at the respective sides of the blade carrier and each cam unit comprises a single member 72 which constitutes both a cam member and a port member, and the end portions of the cam members adjacent the blade carrier are provided with inner surfaces conforming substantially to sections of the first mentioned sphere so that they will have running fit about the spherical surface of the base 66 of the blade carrier, and the outer surfaces of these portions of the cam members also conform to sections of a sphere described about the aforesaid center on the same radius as the outer surface of the blade carrier. The other end portions of these cam members are cylindrical and extend about the shaft 68 and in the present instance are held against rotation therewith. The outer casing 73 of the motor is formed in two parts 74 which abut one against the other on the outer side of the blade carrier and have their inner surfaces conforming to a section of a sphere described about the aforesaid center so as to have a running fit about the spherical surfaces of the blade carrier and a snug fit about the cam member. The cam members are provided with opposed cam surfaces each having two lobes, the high points of which are adjacent to the corresponding lateral surfaces of the blade carrier and may contact with those surfaces but this is not essential as the arrangement of the ports, to be hereinafter described, is such that sealing contact between the cam and the blade carrier is unnecessary. Blades 75 are mounted in the respective slots of the blade carrier for longitudinal movement about a transverse axis coincident with the center of the sphere and the ends of these blades have sealed running contact with the respective cam surfaces and are in lines converging to the center of the sphere. The end surfaces of these blades are in lines converging to the aforesaid center so that each blade in effect comprises a section of a cone. The cam surfaces of the cam members at all opposed circumferential points also converge toward the center of the sphere so as to have sealing contact with the ends of the blades at all times for the full width of the blades.

The frame members 74 of the casing are provided in the outer surfaces of the abutting portions thereof with recesses which form an inlet channel 76 and the recessed portions of these frame members are provided with a circumferential series of inlet ports 77 leading to the spaces between the blade carrier and the cams. Preferably these inlet ports are in the nature of two elongate slots arranged on diametrically opposite sides of the shaft and due to the cutting away or beveling of the corners of the blade carrier, as shown at 71, these inlet ports may be of relatively large capacity. The outer spherical surface of each cam member is provided with a circumferential series of outlet ports 78 which are staggered with relation to the inlet ports, each cam member preferably having two elongate outlet ports arranged on opposite sides of the shaft in the spaces between the corresponding inlet ports. These outlet ports lead to outlet passages 79 which are connected with outlet channels 80 in the outer surface of the motor casing and which become closed channels when the motor is mounted in a supporting structure in the manner shown in Fig. 3.

The operation is shown in the lay-out of Fig. 22. The rotatable blade carrier is shown at 75 and rotates in the direction of the arrow. The cam surfaces are shown at 72 and are in constant sealed engagement with the ends of the blades 75. The inlet ports 77 and the outlet ports 78 are arranged alternately along the respective sides of the blade carrier with an inlet port on each side of the blade carrier opposite an outlet port on the other side of the blade carrier. As a blade passes the forward edge of an inlet port fluid enters the space or work chamber in the rear of the blade and exerts forward pressure thereon. The size of the ports and the spacing of the blades is such that a second blade may move past the rear edge of the inlet before the first mentioned blade has moved beyond the inlet so that the oil or other fluid entering through each inlet acts constantly on two blades. Likewise the spacing between the inlet and outlet ports is such that there will at all times be at least one blade and, in the present instance two blades, in the work chamber between each inlet port and the adjacent outlet ports, these blades serving to seal the chamber so as to prevent the direct flow of fluid from the inlet to the outlet. The fluid which is confined between two blades when the second of those blades moves beyond the inlet is carried forwardly until the foremost of the blades passes the rear edge of the outlet, at which time the fluid is discharged. Thus it will be apparent that fluid is constantly entering both work chambers on both sides of the blade carrier and is being constantly discharged from both work chambers on both sides of the blade carrier.

The arrangement and shapes of the inlet and outlet channels and ports shown in Figs. 17 to 22, are particularly well adapted for use with a propellant of high viscosity where high speed is not required, and in Figs. 23 and 24 there is shown a modification which is better adapted for high speed operation with a propellant of low viscosity. In this modification the shapes and arrangement of the channels and ports are such as to provide not only higher speeds with a low viscosity propellant but also to provide a quieter and smoother operation, a more rapid acceleration of the rotor, substantially identical operating characteristics when the rotor is operating in either direction of rotation, and high overall efficiency.

The blade carrier 85, blades 86, cam members 87 and casing members 88 are substantially the same as shown in Figs. 17 to 22 with the exception of the channels and ports. An outer supporting structure or housing 89 is mounted about the casing 88 and is provided at one end with a radial flange 90 having a running fit about the shaft 91 and at the other end with an internal screw thread to receive a threaded collar or nut 92 which also has a running fit about the shaft. The flange and nut engage the respective casing members so that the tightening of the nut draws the several parts of the motor into proper engagement one with the other. The housing 89 is provided with internal circumferential channels 93 and 94. Normally the channel 93 constitutes the inlet channel and the channels 94 constitute the outlet channels, but the flow of fluid throught the channels may be reversed to reverse the direction of operation of the motor. The outer corners of the blade carrier are not beveled as in the former construction but the lateral surfaces of the slotted portion thereof are in straight converging lines throughout their width. Each part of the casing has formed therein a series of inlet ports 95, there being in the present instance two ports in each series, which connect the inlet channel 93 with the work chambers 96 on the respective sides of the blade carrier. Each inlet port is arranged to discharge the fluid into the work chamber substantially tangentially to the circumference of the work chamber and is taper or otherwise shaped to increase the velocity of the fluid passing through the same. In the present construction each inlet port consists of a circumferential slot in the casing, the front and rear walls 97 and 98 of which are substantially tangential to the inner wall of the casing and the side walls of which converge inwardly. As more clearly shown in Fig. 25, the inlet channel 93 is slightly tapered, or otherwise formed, from its point of connection with the source of fluid supply to the point at which it merges into the last inlet port, to gradually increase the velocity of the fluid flowing through the same and maintain a substantial uniform velocity of the fluid as its enters the work chamber from each inlet port. Due to the shapes and arrangements of the inlet channel and the inlet ports the fluid enters the work chambers tangentially and at substantially uniform velocities, the velocity at each port approximating, but not exceeding, the velocity of the rotor blades, and losses due to turbulence and to changes in the direction of flow of the fluid are reduced to a minimum. As a result the increased kinetic energy of the fluid causes rapid acceleration at starting, the motor operates at a very high speed and the shock at the point of fluid entrance into the work chamber is materially reduced and the motor operates very quietly.

The work chambers are connected with the outlet channels 94 by corresponding series of ports 99, formed in the casing members, which are preferably of the same effective shape, size and arrangement as the inlet ports but are reversed with relation thereto. (Fig. 26). Each outlet channel gradually increases in cross sectional area from the first outlet port to its point of discharge. Due to the outwardly flared shape of the outlet ports and the increasing flow capacity of the outlet channel the flow of the exhaust fluid is de-accelerated and its velocity is decreased as it approaches the point of discharge. Thus the fluid enters the work chambers at a velocity which is substantially uniform at all inlet ports and approximates rotor velocity, and quickly loses its velocity as it passes from the work chambers through the exhaust passages. In addition to providing high uniform velocity the arrangement set forth greatly reduces turbulence, eddy losses and fluid viscous losses, and the material reduction of such turbulence and losses tends to produce a quiet, smooth running motor and to increase efficiency. Further, the outlet channels and ports being substantially identical with the inlet channel and ports the direction of the rotor may be reversed by introducing the fluid through the passages herein characterized as the outlet channels and ports and exhausting the same through the inlet ports and channel, and when so reversed the motor will have the same operating characteristics and will operate with the same efficiency as when the fluid is introduced through the inlet channel and ports.

While I have shown and described certain embodiments of my invention I wish it to be understood that I do not desire to be limited to the details there shown as various further modifications may appear to a person skilled in the art.

Having now fully described my invention, what I claim as new and desire to secure by Letters Patent, is:

1. In a fluid displacement device, cooperating elements at least one of which is movable, said elements having surfaces conforming to sections of spheres having a common center and also having opposed surfaces in lines extending through the common center of said spheres and forming between them a work chamber of progressively varying width, and blades carried by one of said elements and extending into said work chamber.

2. In a fluid displacement device, two elements one of which is movable with relation to the other, a shaft operatively connected with said movable element, said elements having opposed annular surfaces forming between them a work chamber of progressively varying width, all transverse portions of said opposed surfaces being in lines intersecting the axis of said shaft at a common point, and a blade supported by one of said elements and engaging the other of said elements, said blade and the element by which it is supported being relatively movable in the direction of the length of said blades.

3. In a fluid displacement device, two elements one of which is movable with relation to the other, a shaft operatively connected with said movable element, said elements having opposed annular surfaces forming between them a work chamber of progressively varying width, all transverse portions of said opposed surfaces being in lines intersecting the axis of said shaft at a common point, and a blade supported by one of said elements and engaging the other of said elements, said blade and the element by which it is supported being relatively movable in the direction of the length of said blades, the end surface of said blade which engages said other element being in a line intersecting the axis of said shaft at said common point.

4. In a fluid displacement device, two elements one of which is movable with relation to the other, a shaft operatively connected with said movable element, said elements having opposed annular surfaces forming between them a work chamber of progressively varying width, all transverse portions of said opposed surfaces being in lines intersecting the axis of said shaft at a common point, and a blade supported on one of said elements for movement about an axis transverse to the axis of said shaft and having an end surface in contact with the annular surface of the other of said elements, said end surface of said blade being in a line intersecting the axis of said shaft at said common center.

5. A fluid displacement device comprising a casing having an inner circumferential surface conforming to a section of a sphere, two elements mounted in said casing and each having a circumferential surface conforming to and in sealing contact with the inner spherical surface of said casing, said elements having opposed surfaces forming between them an annular work chamber of progressively varying width, one of said elements having fluid displacing movement with relation to the other element and to the spherical surface with which it contacts, and blades carried by one of said elements, engaging the opposed surface of the other element and movable by the relative movement of said elements.

6. In a fluid displacement device, two structures one of which is movable with relation to the other, said structures having oppositely facing surfaces conforming to sections of spheres having a common center, said structures also having parts provided with opposed annular surfaces forming between them a work chamber of progressively varying width, all portions of said annular surfaces being in lines extending through the center of said spheres, and a blade supported by one of said parts and having one end in constant engagement with the annular surface of the other of said parts, said blade and the part supporting the same being relatively movable in the direction of the length of said blade about an axis extending through said common center of said spheres, whereby all movable parts of said device move about said common center.

7. In a fluid displacement device, two structures one of which is movable with relation to the other, said structures having oppositely facing surfaces conforming to sections of spheres having a common center, said structures also having parts provided with opposed annular surfaces forming between them a work chamber of progressively varying width, all portions of said annular surfaces being in lines extending through the center of said spheres, and blades supported by one of said parts for movement about a common transverse axis extending through the center of said spheres, each blade being curved about said transverse axis and having one end thereof in constant movable contact with the annual surfaces of the other of said parts, said ends of said blades and all portions of that annular surface with which said ends contact being in lines extending through the common center of said spheres.

8. In a fluid displacement device, a hollow structure, a shaft rotatable in said structure, said structure having at least a portion of its inner surface conforming to a section of a sphere having its center at the axis of rotation of said shaft, a blade carrying element supported in said structure and having a surface conforming to and in engagement with the spherical surface of said structure, a blade actuating element supported in said structure, said elements having opposed annular surfaces forming between them a work chamber of progressively varying width, each transverse portion of each of said opposed surfaces being in a line extending through the center of said sphere, and blades supported by said blade carrying element and each having a surface conforming to and in movable contact with the spherical surface of said structure, each blade being movable into and out of said work chamber about a transverse axis intersecting the center of said sphere and having constant contact with said surface of said blade actuating element, one of said elements being movable to cause said blades to be actuated by said blade actuating element.

9. In a fluid displacement device, an outer structure and an inner structure, a shaft operatively connected with one of said structures, said structures having oppositely facing surfaces conforming to sections of spheres having a common center at the axis of said shaft, one of said structures including a blade carrying element and the other of said structures including a blade actuating element, said elements having opposed annular surfaces forming between them a work chamber of progressively varying width, each transverse portion of each of said annular surfaces being in a line extending through the center of said spheres, and blades supported by said blade carrying element in movable contact with both of said spherical surfaces, said blades being movable into and out of said work chamber about a common axis intersecting the axis of said shaft at the center of said spheres and having constant contact with the surface of said blade actuating element, one of said elements being movable with relation to the other element to cause movement to be imparted to said blades by said blade actuating element.

10. In a fluid displacement device comprising a blade carrying element and a blade actuating element, said elements having opposed annular surfaces forming between them a work chamber of progressively varying width, one of said elements being rotatable with relation to the other element, each portion of said surface of said blade actuating element being in a line extending through and inclined with relation to the axis of rotation of said rotatable element, and a blade slidably mounted in said blade carrying element for longitudinal movement into and out of said work chamber about an axis transverse to the axis of rotation of said rotatable element and having constant engagement with said inclined surface of said blade actuating element for movement thereby.

11. In a fluid operated motor, a stationary structure and a rotatable structure, one of said structures including an annular blade carrier having a circumferential series of transverse slots each curved about an axis transverse to the axis of said rotatable structure, the slotted portions of the lateral surfaces of said blade carrier converging inwardly, curved blades mounted in the respective slots for longitudinal movement about said transverse axis, the other of said structures including opposed cam surfaces on the respective sides of said blade carrier having all opposed circumferential parts thereof converging inwardly and having running contact with the ends of said blades.

12. In a fluid displacement device, a stationary structure and a rotatable structure, one of said structures including an annular blade carrier and the other of said structures including an annular cam surface arranged to form a work chamber between the same and said blade carrier, said blade carrier having a circumferential series of transverse slots, blades slidably mounted in said slots with their ends in running contact with said cam surface, an inlet passage communicating with said work chamber at the inner sides of said blades, means for connecting said passage with a source of fluid, and an outlet port communicating with said work chamber at the outer sides of said blades.

13. In a fluid operated motor, a casing adapted to be mounted about a shaft, an annular blade carrier supported within said casing, held against rotation and having a circumferential series of transverse slots, a rotor within said casing adapted to be secured to said shaft and including opposed annular cam surfaces having parts in running contact with the respective lateral surfaces of said blade carrier, and other parts spaced from said lateral surfaces to form work chambers, blades slidably mounted in the slots in said blade carrier, the ends of each blade having sealed running contact with the respective cam surfaces, an annular inlet passage between said blade carrier and said shaft, ports in said rotor connecting said inlet passage with said work chambers, said casing having inlet and outlet channels, openings in said blade carrier connecting said inlet channel with said inlet passage, and ports in said rotor connecting said work chambers with said outlet channels.

14. In a fluid operated motor, a casing having an inlet channel and an outlet channel, a tubular member adapted to be mounted on a shaft for rotation in said casing, a blade carrying element and a blade actuating element arranged within said casing to form between them a work chamber, one of said elements being secured to said tubular member and the other of said elements being secured to said casing, said blade carrying element having a circumferential series of transverse slots curved about an axis intersecting the axis of said tubular member, curved blades slidable in said slots, the opposed surfaces of said elements and the ends of said blades being in lines extending through the point of intersection of said axes, an inlet passage between said tubular member and one of said elements communicating with the inner part of said work chamber, and means for connecting said passage with said inlet channel and for connecting the outer side of said work chamber with said outlet channel.

15. In a fluid operated motor, an outer casing adapted to be mounted about a shaft, a stationary blade carrier supported within said casing and having a portion conforming substantially to a section of a sphere the center of which is at the axis of said shaft, said blade carrier having a circumferential series of transverse slots curved about the center of said sphere and having its lateral surfaces respectively in lines converging to the center of said sphere, a rotor adapted to be connected with said shaft for rotation therewith and comprising two annular cam units arranged at the respective sides of said blade carrier, each cam unit including an inner port member, a cam member mounted on said port member, and an outer port member mounted on said cam member, said members having contacting surfaces each comprising a section of a sphere described about the center of the first mentioned sphere, said cam member having a cam surface provided with lobes to form work chambers between the same and the adjacent lateral surface of said blade carrier, all opposed circumferential portions of said cam surfaces being spaced the same distance one from the other and being in lines converging to the center of said sphere, blades slidably mounted in the slots of said blade carrier and curved about the center of said sphere, each blade having its ends in lines converging to the center of said sphere and in sealed running contact with the respective cam surfaces, said inner and outer port members having respectively inlet and outlet ports communicating with said work chambers, and means for connecting said inlet and outlet ports respectively with a fluid supply conduit and an exhaust conduit.

16. In a fluid operated motor, an outer casing adapted to be mounted about a shaft, a stationary blade carrier supported within said casing and having a portion conforming substantially to a section of a sphere, the center of which is at the axis of said shaft, said blade carrier having a circumferential series of transverse slots curved about the center of said sphere and having its lateral surfaces respectively in lines converging to the center of said sphere, a rotor adapted to be connected with said shaft for rotation therewith and comprising two annular cam units arranged at the respective sides of said blade carrier, each cam unit including an inner port member, a cam member mounted on said port member, and an outer port member mounted on said cam member, said members having contacting surfaces each comprising a section of a sphere described about the center of the first mentioned sphere, said cam member having a cam surface provided with lobes in running contact with the adjacent lateral surface of said blade carrier, all opposed circumferential portions of said cam surfaces of the two cam members being spaced the same distance one from the other and being in lines converging to the center of said sphere, blades slidably mounted in the slots of said blade carrier and curved about the axis of said sphere, each blade having its ends in lines converging to the center of said sphere and in sealed running contact with the respective cam surfaces, said inner port members having inlet ports connecting the space between said inner port members with the spaces between the lobes of said cam surfaces, said outer casing having an inlet channel extending about said blade carrier and outlet channels extending about the respective outer port members, said blade carrier having a circumferential series of openings connecting said inlet channel with the space between said inner port members, and said outlet port members having outlet ports connecting the spaces between the lobes of said cam surfaces with said outlet channels.

17. In a fluid operated motor, a stationary structure and a rotatable structure, one of said structures including an annular blade carrier having a circumferential series of transverse slots each curved about an axis transverse to the axis of rotation of said rotatable structure, the other of said structures including inner and outer port members and an annular cam member between said port members, said members having contacting surfaces conforming to sections of spheres having a common center at the axis of said rotatable member, said cam member also having a cam surface opposed to the slotted portion of the adjacent lateral surface of said blade carrier, curved blades mounted in the slots in said blade carrier and having their ends in running contact with said cam surface, said ends of said blades and all circumferential parts of said cam surface being in lines extending through the common center of said spheres, and means cooperating with said cam surface to move the end portions of said blades into and out of the space between said cam surfaces and said blade carrier.

18. In a fluid operated motor, a stationary structure and a rotatable structure, one of said structures including two annular cam members having opposed axially spaced cam surfaces all opposed parts of which converge inwardly, the other of said structures including an annular blade carrier arranged between said cam surfaces, having a circumferential series of transverse slots in the outer portion thereof and having inwardly converging lateral surfaces, and also having its outer corners cut away to form circumferential recesses, blades mounted in said slots for longitudinal movement therein and having inwardly converging end surfaces contacting the respective cam surfaces, and a casing extending about said structures and having inlet ports communicating with the spaces between the lateral surfaces of said blade carrier and the respective cam surfaces and also having outlet channels, said cam members having therein outlet ports connecting said spaces with the respective outlet channels.

19. In a fluid operated motor, a stationary structure and a rotatable structure, one of said structures including two annular cam members having opposed axially spaced cam surfaces all opposed parts of which converge inwardly, the other of said structures including an annular blade carrier arranged between said cam surfaces, having a circumferential series of transverse slots in the outer portion thereof and having inwardly converging lateral surfaces, and also having its outer corners cut away to form circumferential recesses, blades mounted in said slots for longitudinal movement therein and having inwardly converging end surfaces contacting the respective cam surfaces, and a casing extending about said structures and having on opposite sides of the motor axis circumferential elongate inlet ports communicating with the spaces between said blade carrier and the respective cam surfaces, said casing also having outlet channels and each cam member having on opposite sides of said axis circumferential outlet ports connecting said spaces with the respective outlet channels, said outlet ports being circumferentially spaced with relation to said inlet ports.

20. In a fluid operated motor, an annular blade carrying element, an annular cam element, one of said elements being rotatable, said blade carrying element having an inner portion and a relatively narrow outer portion, both portions having outer surfaces conforming to sections of spheres having a common center and said outer portion having a circumferential series of transverse slots curved about said center, said cam element having inner and outer surfaces conforming to sections of spheres described about said center, said inner surface being in running contact with a spherical surface of the inner portion of said blade carrying element, said cam element also having a cam surface opposed to the adjacent lateral surface of the outer portion of said blade carrying element to form a work chamber between said elements, all parts of said opposed surfaces being in lines extending through the center of said spheres, a casing mounted about said elements and having an inner surface conforming to a section of a sphere described about said center and engaging the outer spherical surface of said cam element and of the outer portion of said blade carrying element and also having circumferentially spaced inlet and outlet ports communicating with said work chamber, and an outer structure extending about said casing and forming between the same and the casing circumferential inlet and outlet chambers each communicating respectively with said inlet and outlet ports.

21. In a fluid operated motor, a stationary structure and a rotatable structure, one of said structures including an annular blade carrier comprising an inner portion adapted to be mounted about a shaft, and a relatively narrow outer portion, the outer surfaces of both portions conforming to sections of spheres having a common center at the axis of said blade carrier, said outer portion having a circumferential series of slots curved about an axis extending through the center of said spheres, the other of said structures including annular cam members supported at the respective sides of said blade carrier and forming work chambers on the respective sides of the latter, each cam member having an inner surface conforming to a section of a sphere described about said center and in running contact with the spherical surface of the inner portion of said blade carrier and also having an outer surface conforming to a section of a sphere described about said center, said cam members having opposed cam surfaces in lines converging to the center of said spheres, curved blades mounted in the slots of said blade carrier and each having its end surfaces in lines converging to the center of said spheres and in running contact with the respective cam surfaces, said stationary structure also including a casing having an inner surface conforming to a section of a sphere described about said center and engaging the spherical outer surfaces of said blade carrier and said cam members, inlet and outlet channels extending circumferentially of said work chambers and ports connecting said channels with said work chamber.

22. In a fluid operated motor, an annular blade carrier comprising an inner portion adapted to be secured to a shaft, and a relatively narrow outer portion, the outer surfaces of both portions conforming to sections of spheres having a common center at the axis of said shaft, said outer portion having a circumferential series of transverse slots curved about an axis transverse to said shaft and coincident with the center of said spheres, annular stationary cam members supported at opposite sides of said blade carrier and each having an inner surface conforming to a section of a sphere described about said center and in running contact with the spherical surface of the inner portion of said blade carrier and also having an outer surface conforming to a section of a sphere described about said center on the same radius as the spherical surface of the outer portion of said blade carrier, said cam members having opposed cam surfaces in lines converging to the center of said spheres, curved blades mounted in the slots of said blade carrier and each having its end surfaces in lines converging to said center and in running contact with the respective cam surfaces, and a casing having an inner surface conforming to a section of a sphere described about said center and in engagement with the outer surfaces of said blade carrier and said cam members, said casing having two series of inlet ports communicating with the spaces between said blade carrier and the respective cam surfaces, and each cam member having a series of outlet ports communicating with said spaces and staggered with relation to the corresponding series of inlet ports.

23. In a fluid operated motor, an annular blade carrier comprising an inner portion adapted to be secured to a shaft, and a relatively narrow outer portion, the outer surfaces of both portions conforming to sections of spheres having a common center at the axis of said shaft, said outer portion having a circumferential series of transverse slots curved about an axis transverse to said shaft and coincident with the center of said spheres, annular stationary cam members supported at opposite sides of said blade carrier and each having an inner surface conforming to a section of a sphere described about said center and in running contact with the spherical surface of the inner portion of said blade carrier and also having an outer surface conforming to a section of a sphere described about said center on the same radius as the spherical surface of the outer portion of said blade carrier, said cam members having opposed cam surfaces in lines converging to the center of said spheres, curved blades mounted in the slots of said blade carrier and each having its end surfaces in lines converging to said center and in running contact with the respective cam surfaces, and a casing having an inner surface conforming to a section of a sphere described about said center and in engagement with the outer surfaces of said blade carrier and said cam member, said blade carrier having its outer corners beveled to provide the spaces between the same and said cam with enlarged outer portions, and said casing having a circumferential series of elongate inlet ports each communicating with the space between said blade carrier and one of said cam surfaces and also having outlet channels, and said cam members each having in the spherical outer surface thereof a circumferential series of elongate outlet ports connecting the space between its cam surface and said blade carrier with an outlet channel, said outlet ports being spaced circumferentially from the corresponding inlet ports.

24. In a fluid operated motor, a casing, an annular blade carrying member, an annular cam member having a cam surface arranged at one side of said blade carrying member to form a work chamber between said members, one of said members being rotatable, blades carried by said blade carrier and having running contact with said cam surface, means cooperating with said cam surface to move said blades into and out of said work chamber, said casing having a series of circumferentially spaced inwardly tapered inlet and outlet ports substantially tangential to said work chamber and also having a series of circumferentially spaced outlet ports, and inlet and outlet channels communicating respectively with said inlet and outlet ports and each extending about the major portion of said casing.

25. In a fluid operated motor, a casing, an annular blade carrying member, an annular cam member having a cam surface arranged at one side of said blade carrying member to form a work chamber between said members, one of said members being rotatable, blades carried by said blade carrier and having running contact with said cam surface, means cooperating with said cam surface to move said blades into and out of said work chamber, said casing having a series of circumferentially spaced inwardly tapered inlet and outlet ports substantially tangential to said work chamber and also having a series of circumferentially spaced outlet ports, an inlet channel extending about said series of inlet ports communicating with each port of said series and decreasing in cross sectional area in the direction of flow, and an outlet channel extending about said series of outlet ports and communicating with each of said outlet ports.

26. In a fluid operated motor, a stationary structure, a rotatable structure, one of said structures including an annular blade carrier having a circumferential series of transverse slots and the other of said structures having annular cam surfaces arranged on the respective sides of said blade carrier to form annular work chambers between said cam surfaces and said blade carrier, blades mounted in said slots in running contact with said cam surfaces, a casing extending about said structures and having circumferentially spaced inlet ports arranged to direct fluid against the blades in said work chambers and circumferentially spaced outlet ports to receive fluid from said work chambers, inlet and outlet channels extending about the major portion of said casing and communicating respectively with said inlet ports and said outlet ports, said inlet channel decreasing in cross sectional area in the direction of flow.

27. In a fluid operated motor, a stationary structure and a rotatable structure, one of said structures including an annular blade carrier having a circumferential series of slots and the other of said structures including cam members arranged on opposite sides of said blade carrier to form work chambers between the latter and the respective cam members, blades mounted in said slots for longitudinal movement about an axis transverse to the axis of said rotatable structure and having running contact with the respective cam members, a casing arranged about said structures and having two series of inlet ports leading to work chambers on the respective sides of said blade carrier, each inlet port being substantially tangential to the work chamber with which it communicates, said casing also having two series of outlet ports leading from the work chambers on the respective sides of said blade carrier, and an inlet channel extending about said casing and connected with the inlet ports of both series, and outlet channels extending about the casing and communicating with the outlet ports of the respective series.

28. In a fluid operated motor, a stationary structure and a rotatable structure, one of said structures including an annular blade carrier having a circumferential series of slots and the other of said structures including cam members arranged on opposite sides of said blade carrier to form work chambers between the latter and the respective cam members, blades mounted in said slots for longitudinal movement and having running contact with the respective cam members, a casing arranged about said structures and having two series of inlet ports leading to work chambers on the respective sides of said blade carrier, each inlet port being substantially tangential to the work chamber with which it communicates, said casing also having two series of outlet ports leading from the work chambers on the respective sides of said blade carrier and substantially identical with said inlet ports in shape and arrangement, and an inlet channel extending about said casing, communicating with the inlet ports of both series and decreasing in cross section to cause fluid to be delivered to said work chambers from all inlet ports at substantially the same velocity, and outlet channels extending about said casing and communicating with the outlet ports of the respective series, and outlet channels extending about said casing and communicating with the outlet ports of the respective series.

29. In a fluid operated motor, a stationary structure and a rotatable structure, one of said structures including an annular blade carrier having a circumferential series of slots and the other of said structures including cam members arranged on opposite sides of said blade carrier to form work chambers between the latter and the respective cam members, blades mounted in said slots for longitudinal movement and having running contact with the respective cam members, a casing arranged about said structures and having two series of inlet ports leading to work chambers on the respective sides of said blade carrier, each inlet port being substantially tangential to the work chamber with which it communicates, said casing also having two series of outlet ports leading from the work chambers on the respective sides of said blade carrier, and an inlet channel extending about said casing, communicating with both series of inlet ports and gradually decreasing in cross sectional area from its point of connection with the fluid source to its point of connection with the last inlet port of said series, and outlet channels extending about said casing, communicating with the respective series of outlet ports and gradually increasing in cross sectional area toward their points of discharge.

30. In a fluid operated motor, a stationary structure and a rotatable structure, one of said structures including an annular blade carrier having a circumferential series of transverse slots and the other of said structures including cam members arranged on opposite sides of said blade carrier to form work chambers between the latter and the respective cam members, blades mounted in said slots for longitudinal movement and having running contact with the respective cam members, a casing arranged about said structure and having two series of circumferentially spaced inlet ports leading to the work chambers on the respective sides of said blade carrier, each inlet port being substantially tangential to the work chamber with which it communicates and having inwardly converging walls, said casing also having two series of circumferentially spaced outlet ports leading from the work chambers on the respective sides of said blade carrier, said outlet ports being substantially tangential to the work chambers with which they communicate, having outwardly diverging walls and being of substantially the same size and shape as said inlet ports, and a housing extending about said casing and having a circumferential channel communicating with both series of inlet ports and decreasing gradually in cross sectional area from the first inlet port to the last inlet port, said housing also having circumferential outlet channels on opposite sides of said inlet channel, communicating with the respective series of outlet ports and each increasing gradually in cross sectional area from its point of connection with the first outlet port to its point of discharge.

CECIL A. MANN.